US008268230B2

(12) United States Patent
Cherepy et al.

(10) Patent No.: US 8,268,230 B2
(45) Date of Patent: Sep. 18, 2012

(54) FABRICATION OF TRANSPARENT CERAMICS USING NANOPARTICLES

(75) Inventors: Nerine J. Cherepy, Oakland, CA (US);
Thomas M. Tillotson, Tracy, CA (US);
Joshua D. Kuntz, Livermore, CA (US);
Stephen A. Payne, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1398 days.

(21) Appl. No.: 11/805,275

(22) Filed: May 21, 2007

(65) Prior Publication Data

US 2008/0090716 A1    Apr. 17, 2008

Related U.S. Application Data

(60) Provisional application No. 60/808,436, filed on May 24, 2006.

(51) Int. Cl.
*B28B 3/00* (2006.01)
(52) U.S. Cl. .................................................. 264/621
(58) Field of Classification Search .................. 264/621; 501/12
See application file for complete search history.

(56) References Cited

U.S. PATENT DOCUMENTS 4,131,479 A    12/1978  Ichinose et al.

OTHER PUBLICATIONS

Zarate, J., Lopez, R., & Aguilar, E. A., "Synthesis of Yttrium Aluminum Garnet by Modifying the Citrate Precursor Method." AZojomo Journal of Materials Online Oct. 2005.*
Mah, T., Parthasarathy, T. A., & Lee, H. D., "Polycrystalline YAG; structural or functional?" Journal of Ceramic Processing Research 2004, vol. 5, No. 4, pp. 369-379.*
E. Zych, C. Brecher, A. J. Wojtowicz, H. Lingertat, Luminescence properties of Ce-activated YAG optical ceramic scintillator materials, Journal of Luminescence, vol. 75, Issue 3, Oct. 1997, pp. 193-203.*
Semion Z. Shmurak et al., Studies of nanocrystalline rare earth gallate and aluminate scintillators prepared by a new method, Nuclear Instruments and Methods in Physics Research A, vol. 537, Jan. 21, 2005, pp. 149-153.*
Liu, X.J., et al., "Cerium-doped lutetium aluminum garnet optically transparent ceramics fabricated by a sol-gel combustion process," J. Mater. Res., vol. 21, No. 6, Jun. 2006, pp. 1519-1525.
Cherepy, N.J., et al., "Cerium-doped single crystal and transparent ceramic lutetium aluminum garnet scintillators," Elsevier Science, 2006, 4 pgs.
Cerepy, N.J., et al., "Transparent Ceramic Lutetium Aluminum Garnet Scintillators," Lawrence Livermore National Laboratory, UCRL-ABS-221522, May 19, 2006, 4 pgs.

* cited by examiner

*Primary Examiner* — Matthew Daniels
*Assistant Examiner* — Russell Kemmerle, III
(74) *Attorney, Agent, or Firm* — Eddie E. Scott

(57) ABSTRACT

A method of fabrication of a transparent ceramic using nano-particles synthesized via organic acid complexation-combustion includes providing metal salts, dissolving said metal salts to produce an aqueous salt solution, adding an organic chelating agent to produce a complexed-metal sol, heating said complexed-metal sol to produce a gel, drying said gel to produce a powder, combusting said powder to produce nano-particles, calcining said nano-particles to produce oxide nano-particles, forming said oxide nano-particles into a green body, and sintering said green body to produce the transparent ceramic.

38 Claims, 5 Drawing Sheets

FABRICATION OF TRANSPARENT CERAMICS USING NANOPARTICLES

CROSS-REFERENCE TO RELATED APPLICATIONS

This application claims the benefit of U.S. Provisional Patent Application No. 60/808,436 filed May 24, 2006 and titled "Method for Fabrication of Transparent Ceramics Using Nanoparticles Synthesized via Organic Acid Complexation/Combustion Route." U.S. Provisional Patent Application No. 60/808,436 filed May 24, 2006 and titled "Method for Fabrication of Transparent Ceramics Using Nanoparticles Synthesized via Organic Acid Complexation/Combustion Route" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to ceramics and more particularly to fabrication of transparent ceramics using nanoparticles.

2. State of Technology

An inorganic scintillator plays an important role in radiation detection in many sectors of research concerning almost all medical diagnostic imaging modalities that use x-ray or gamma rays, dosimetry, nuclear medicine, high energy physics, airport security inspection, and so on. This State of Technology Information is described in the article, "cerium-doped lutetium aluminum garnet optically transparent ceramics fabricated by a sol-gel combustion process" by Xue-Jian Liu; Hui-Li Li; Rong-Jun Xie; Naoto Hirosaki; Xin Xu; Li-Ping Huang; Journal of Material Research, Vol. 21, No. 6, June 2007, pp. 1519-1525.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method of synthesizing nanoparticles using aqueous organic complexation/combustion to provide transparent ceramic materials. The present invention also provides a transparent ceramic including a garnet structure such as $Lu_3Al_5O_{12}$ or $Y_3Al_5O_{12}$. Nanocrystals are sintered under controlled conditions to form optically transparent polycrystalline optical materials. Transparent ceramic processing is a route to fabrication of polycrystalline materials exhibiting more uniform doping, homogeneity and potential for very large size compared to single crystals of the same material.

One embodiment of the present invention provides a method of making a transparent ceramic including the steps of providing metal salts, dissolving said metal salts to produce an aqueous salt solution, adding an organic chelating agent to produce a complexed-metal sol, heating said complexed-metal sol to produce a gel, drying said gel to produce a powder, combusting said powder to produce oxide nano-particles, forming said oxide nano-particles into a green body, and sintering said green body to produce the transparent ceramic.

Another embodiment of the present invention provides a method of fabrication of a transparent ceramic using nanoparticles synthesized via organic acid complexation-combustion including the following steps: providing nitrate or chloride or nitrate and chloride metal salts, dissolve and stir, produce an aqueous salt solution, add citric acid, produce a metal citrate sol, heat and stir, produce a citrate gel, dry the gel, produce a powder, combust in air, produce a oxide nano-particles, form a green body, and vacuum sinter the green body at 1700-1900° C. to produce the transparent ceramic.

One embodiment of the present invention provides a transparent ceramic having a garnet structure including $Lu_3Al_5O_{12}$. Another embodiment of the present invention provides a transparent ceramic having a garnet structure including $Y_3Al_5O_{12}$.

The present invention has many uses. For example, the present invention has use in producing scintillator crystals for radiation counters. The present invention also has use in producing transparent armor. The present invention also has use in producing scintillators for X-ray imaging, computer tomography (CT) screens, and positron emission tomography (PET) detectors. The present invention has use in producing transparent optical ceramics for multiple uses including blast shields, optics, and laser crystals.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
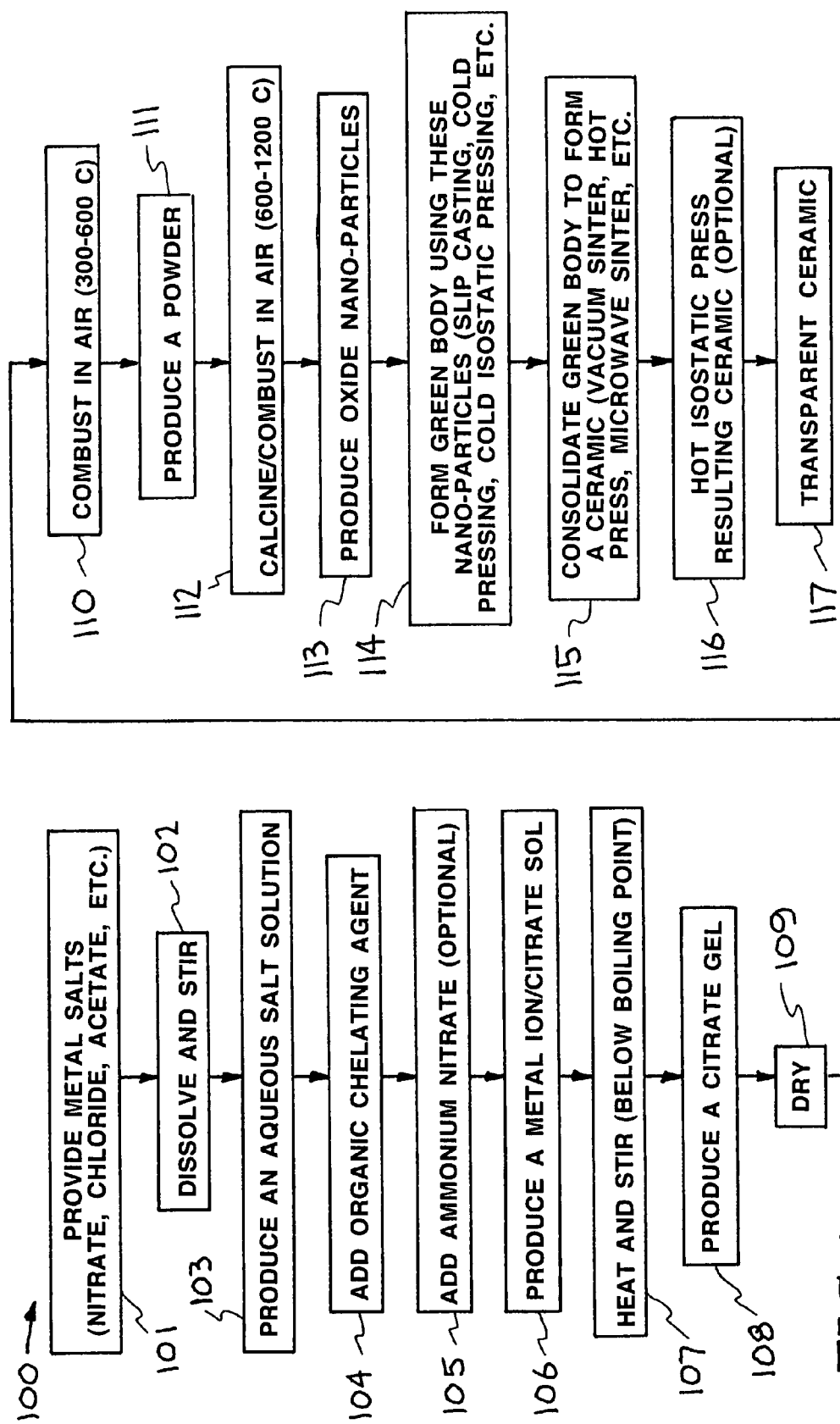
FIG. 1 illustrates an embodiment of the present invention showing a method of synthesizing nanoparticles using aqueous organic complexation/combustion to provide transparent ceramic materials.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a method for fabrication of transparent ceramics using nanoparticles synthesized via organic complexation/combustion route. In one embodiment the present invention provides a method of synthesizing nanoparticles using aqueous organic complexation/combustion to provide transparent ceramic materials. Referring to the drawings and in particular to FIG. 1, a method of synthesizing nanoparticles using aqueous organic complexation/combustion to provide transparent ceramic materials is illustrated. The method is designated generally by the reference numeral 100. The method 100 includes the following steps:

Step #101 provide metal salts (nitrate, chloride, acetate, acetylacetonate, carbonate, etc.).
Step #102 dissolve and stir.
Step #103 produces an aqueous salt solution.
Step #104 add organic chelating agent.
Step #105 (Optional Step) add ammonium nitrate.
Step #106 produces a complexed-metal sol.
Step #107 heat (below boiling point) and stir.
Step #108 produces a gel.
Step #109 dry the gel.
Step #110 combust in air (300-600° C.).
Step #111 produces a powder.
Step #112 calcine in air at (600-1200° C.).
Step #113 produce oxide nano-particles.
Step #114 form a green body (slip casting, cold pressing, cold isostatic pressing, etc. of particles in a mold to form green body).
Step #115 consolidate (vacuum sinter, hot press, microwave sinter, etc.)
Step #116 (Optional Step) hot isostatic press.
Step #117 produces a transparent ceramic.

Particles synthesized via solution synthesis in which organic chelating agents and particularly organic acids are found to be relatively unagglomerated, monodisperse and uniform in composition and crystal phase, compared to particles synthesized through sol-gel or precipitation routes not employing chelation. Advantages include: economical particle synthesis, reduction in ceramics processing steps, facile formation of dense transparent solids without the need for sintering agents or other additives. Further illustrating the functionality of transparent ceramics thus fabricated, one embodiment of this invention describes fabrication of transparent ceramic Lutetium Aluminum Garnet, doped with Cerium, that exhibits scintillation performance on a par with that of a single crystal.

The present invention also provides a transparent oxide ceramic, wherein the transparent ceramic has been sintered from non-agglomerated nano-particles, the particles having been synthesized by use of an organic chelating agent followed by combustion. In one embodiment the organic chelating agent is citrate. In one embodiment the chelating agent is a tri-dentate organic species. In one embodiment the chelating agent is the oxalic, malic, polygalacturonic, tannic, fulvic, tartaric, succinic, pyruvic, or other organic species. In one embodiment the sintering is preceded by formation of a gelatinous state.

Figure 2:
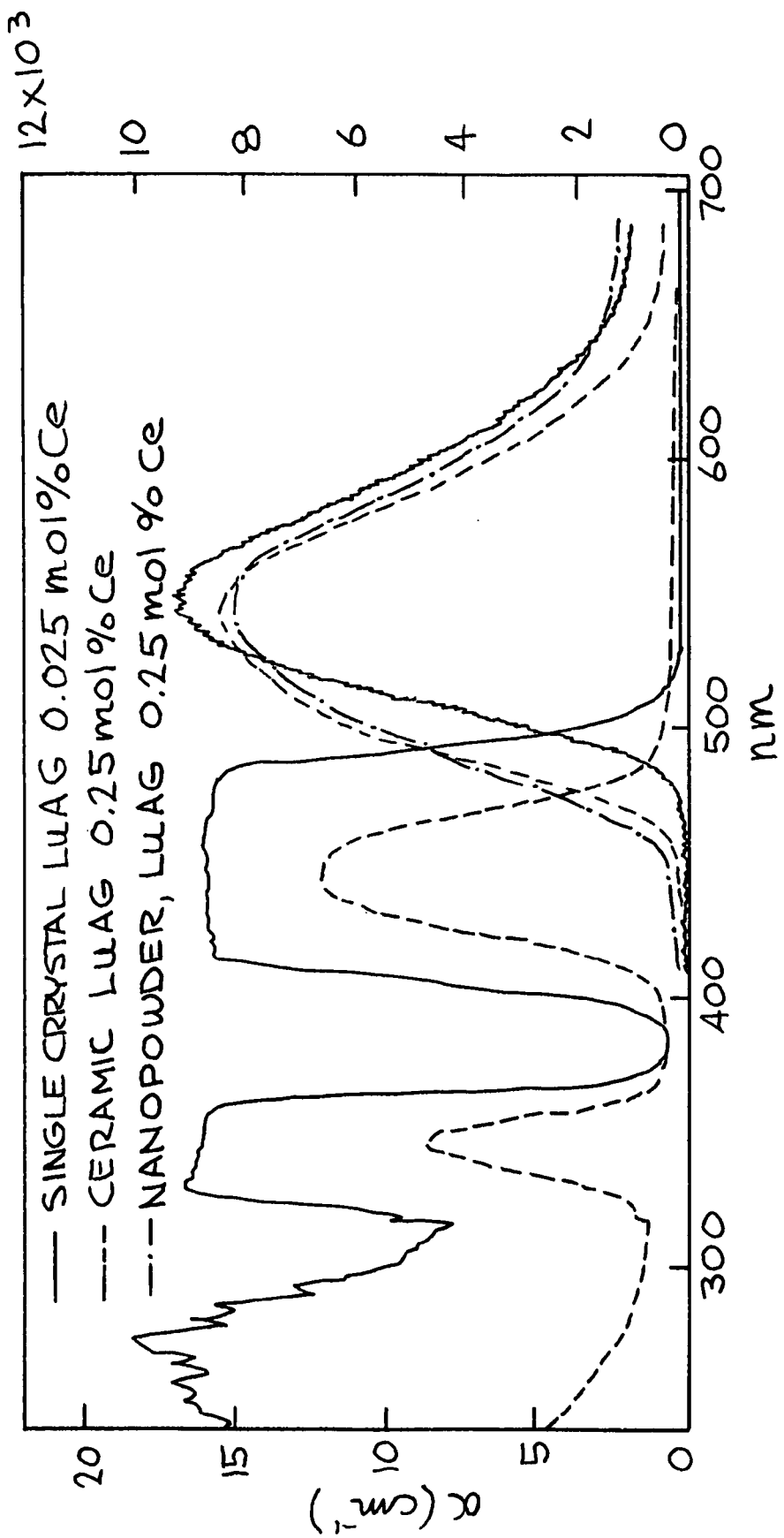
FIG. 2 shows radioluminescence of a ceramic fabricated by use of nanoparticles synthesized using aqueous organic complexation/combustion that has a garnet structure, $Lu_3Al_5O_{12}$.

Referring to FIG. 2, an embodiment of the ceramic is illustrated. FIG. 2 is an Alpha-excited radioluminescence spectra from $Lu_3Al_5O_{12}$:Ce single crystal, ceramic and nanopowder. The ceramic illustrated in FIG. 2 has a garnet structure, $Lu_3Al_5O_{12}$, which exhibits scintillation performance and transparency on par with that of a single crystal of the same material.

Example

Fabrication of a LuAG:Ce transparent ceramic was performed as follows. LuAG:Ce nanoparticles were made using nitrates as precursors. Stoichiometric ratios of $LuNO_3*XH_2O$, $Al(NO_3)_3*9H_2O$ and dopants were mixed together and dissolved in an aqueous citric acid solution. This was heated to 80° C. and stirred for 1-8 hours. Then the mixture was heated in a furnace at 110° C. for 24 hours. The resulting material was calcined at 1100° C. (10° C./min ramp) for 4 hours leading to the formation of fully crystalline particles. Transparent ceramics were made by slip casting followed by vacuum sintering for 2-12 hours at 1700-1900° C.

Figure 3:
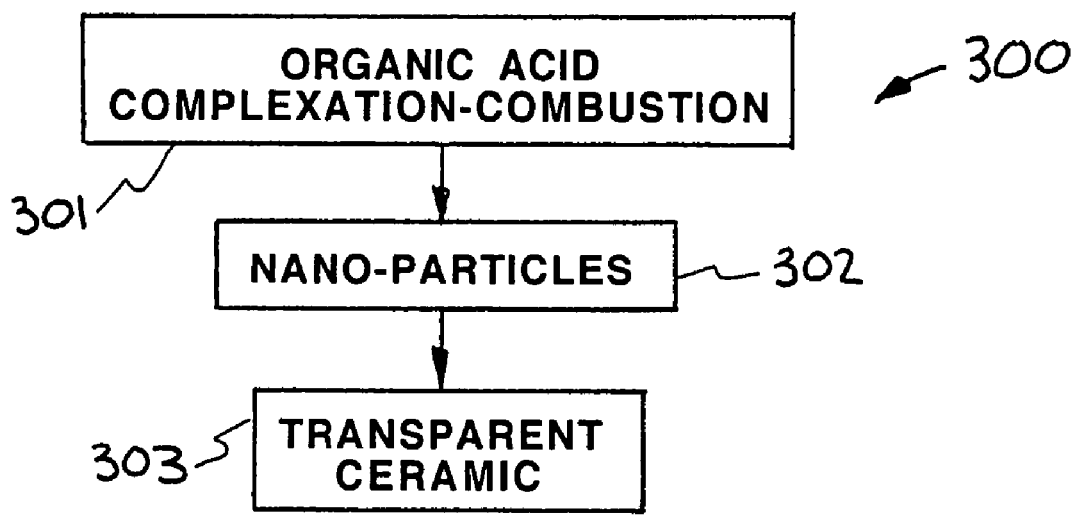
FIG. 3 illustrates another embodiment of a method of synthesizing nanoparticles using aqueous organic complexation/combustion to provide transparent ceramic materials.

Referring to FIG. 3, another embodiment of the present invention is illustrated. This embodiment is designated generally by the reference numeral 300. The embodiment is a method 300 that includes a series of steps. In step 301, nanoparticles 301 are provided. In step 302, the nanoparticles 301 are synthesized via organic acid complexation-combustion. This produces a ceramic 303.

The embodiment 300 provides a method of fabrication of a transparent ceramic 303 using nanoparticles 302 synthesized via organic acid complexation-combustion 301. In the method, the organic chelating agent is a tri-dentate organic species. In one embodiment, the transparent ceramic 303 has a cubic crystal structure. In another embodiment, the transparent ceramic 303 has a cubic garnet structure including $Lu_3Al_5O_{12}$, $Y_3Al_5O_{12}$, $Gd_3Al_5O_{12}$ and related materials, $(A_{1-x}, B_x, etc.)_3(C_{1-y}, D_y, etc.)_5O_{12}$ where first site (A, B, etc.) can contain any mixture of the following that results in the garnet structure: Y, Gd, Lu, La, Th, Pr; and the second site (C, D, etc.) site can contain any mixture of the following that results in the garnet structure: Al, Ga, Sc.

In one embodiment, the transparent ceramic is formed by cold uniaxial pressing followed by vacuum sintering, and subsequent hot isostatic pressing or any combination thereof. In another embodiment, the method 300 is a method of making transparent oxide ceramic scintillators, wherein the transparent ceramic has been sintered from non-agglomerated nano-particles, the particles having been synthesized by use of the organic complexation-combustion method. In one embodiment the ceramic scintillator is activated using Ce or Pr. In another embodiment, the scintillator is activated using Bi, Eu, Th, Gd, Sm, Er, Nd or other species resulting in strong luminescence or a combination thereof. In one embodiment, the transparent ceramic is formed by the steps of: (A) green body formation via uniaxial pressing, cold isostatic pressing, or slip casting, (B) followed by consolidation via vacuum sintering, controlled atmosphere sintering, pulsed-electric current sintering, plasma sintering, microwave sintering, laser sintering, radio-frequency sintering, hot-pressing, and (C) and subsequent hot isostatic pressing to improve clarity if necessary, or any combination thereof.

Figure 4:
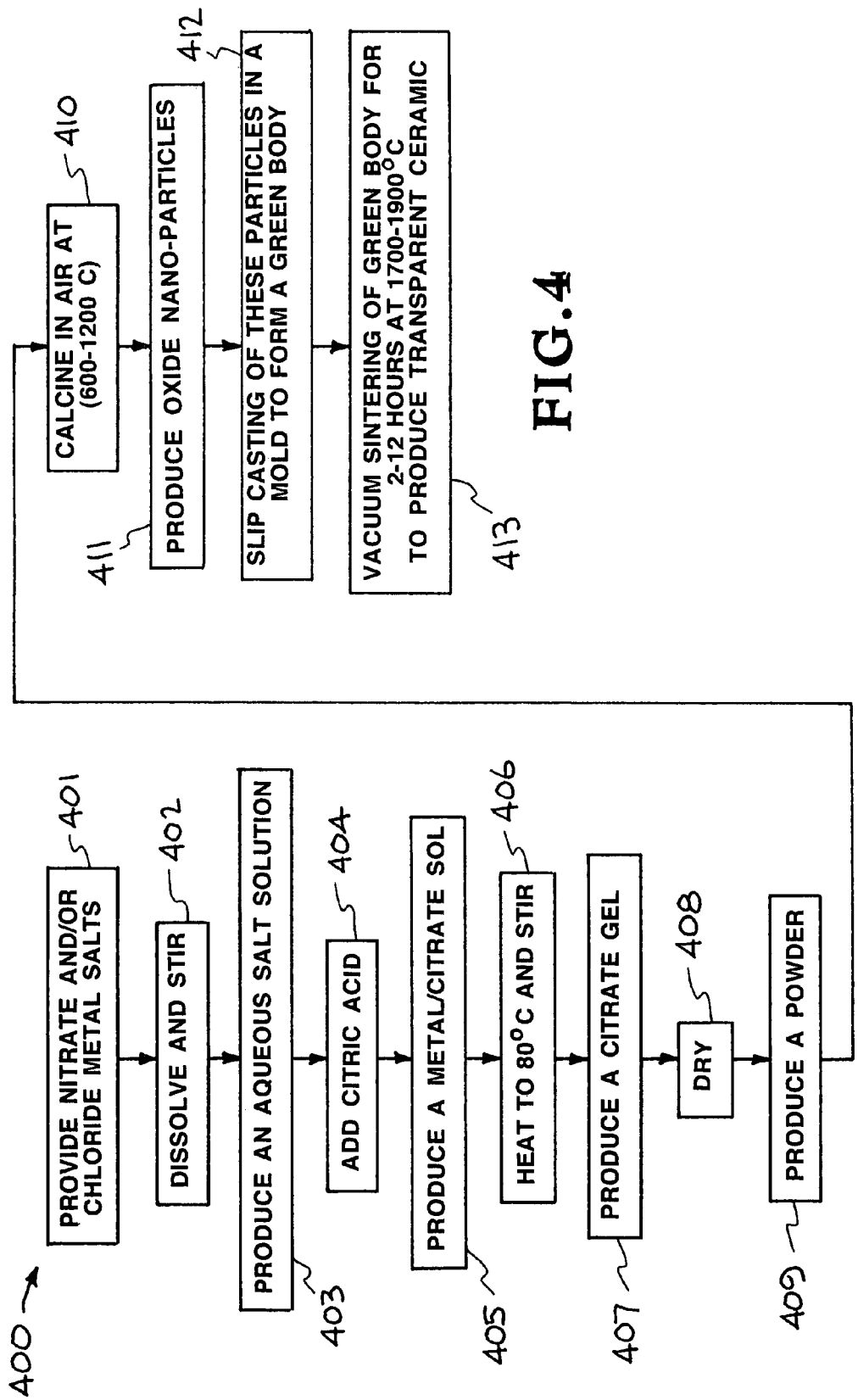
FIG. 4 illustrates another embodiment of the present invention showing a method of synthesizing nanoparticles using aqueous organic acid complexation/combustion to provide transparent ceramic materials.

Referring to FIG. 4, another embodiment of a method of synthesizing nanoparticles using aqueous organic acid complexation/combustion to provide transparent ceramic materials is illustrated. The method is designated generally by the reference numeral 400. The method produces transparent ceramic materials. The method 400 includes the following steps:

Step #401 provide nitrate and/or chloride metal salts.
Step #402 dissolve and stir.
Step #403 produces an aqueous salt solution.

Step #404 add citric acid.
Step #405 produces a metal/citrate sol.
Step #406 heat to 80° C. and stir.
Step #407 produces a citrate gel.
Step #408 dry the gel.
Step #409 produces a powder.
Step #410 calcined in air at 600-1200° C.
Step #411 produces an oxide nano-particle.
Step #412 slip casting of these particles in a mold to form green body.
Step #413 vacuum sintering of green body for 2-12 hours at 1700-1900° C. to produce the transparent ceramic.

As illustrated in FIG. 4, the present invention provides a method 400 of fabricating a transparent ceramic. The 400 includes the steps of providing nitrate or chloride metal salts or nitrate and chloride metal salts (401), dissolve and stir said nitrate or chloride metal salts or nitrate and chloride metal salts (402) to produce an aqueous salt solution (403), add citric acid (404) to produce a metal citrate sol (405), heat and stir said metal citrate sol (406) to produce a citrate gel (407), dry said citrate gel (408) to produce a powder (409), calcine said powder in air (410) to produce oxide nano-particles (411), slip cast said oxide nano-particles to form a green body (412), and vacuum sinter said green body to produce the transparent ceramic (413).

Particles synthesized via solution synthesis in which organic chelating agents and particularly organic acids are found to be relatively unagglomerated, monodisperse and uniform in composition and crystal phase, compared to particles synthesized through sol-gel or precipitation routes not employing chelation. Advantages include: economical particle synthesis, reduction in ceramics processing steps, facile formation of dense transparent solids without the need for sintering agents or other additives. Further illustrating the functionality of transparent ceramics thus fabricated, one embodiment of this invention describes fabrication of transparent ceramic Lutetium Aluminum Garnet, doped with Cerium, that exhibits scintillation performance on a par with that of a single crystal.

The present invention also provides a transparent oxide ceramic, wherein the transparent ceramic has been sintered from non-agglomerated nano-particles, the particles having been synthesized by use of an organic chelating agent followed by combustion. In one embodiment the organic chelating agent is citrate. In one embodiment the chelating agent is a tri-dentate organic species. In one embodiment the chelating agent is the oxalic, malic, polygalacturonic, tannic, fulvic, tartaric, succinic, pyruvic, or other organic species. In one embodiment the sintering is preceded by formation of a gelatinous state.

Figure 5:
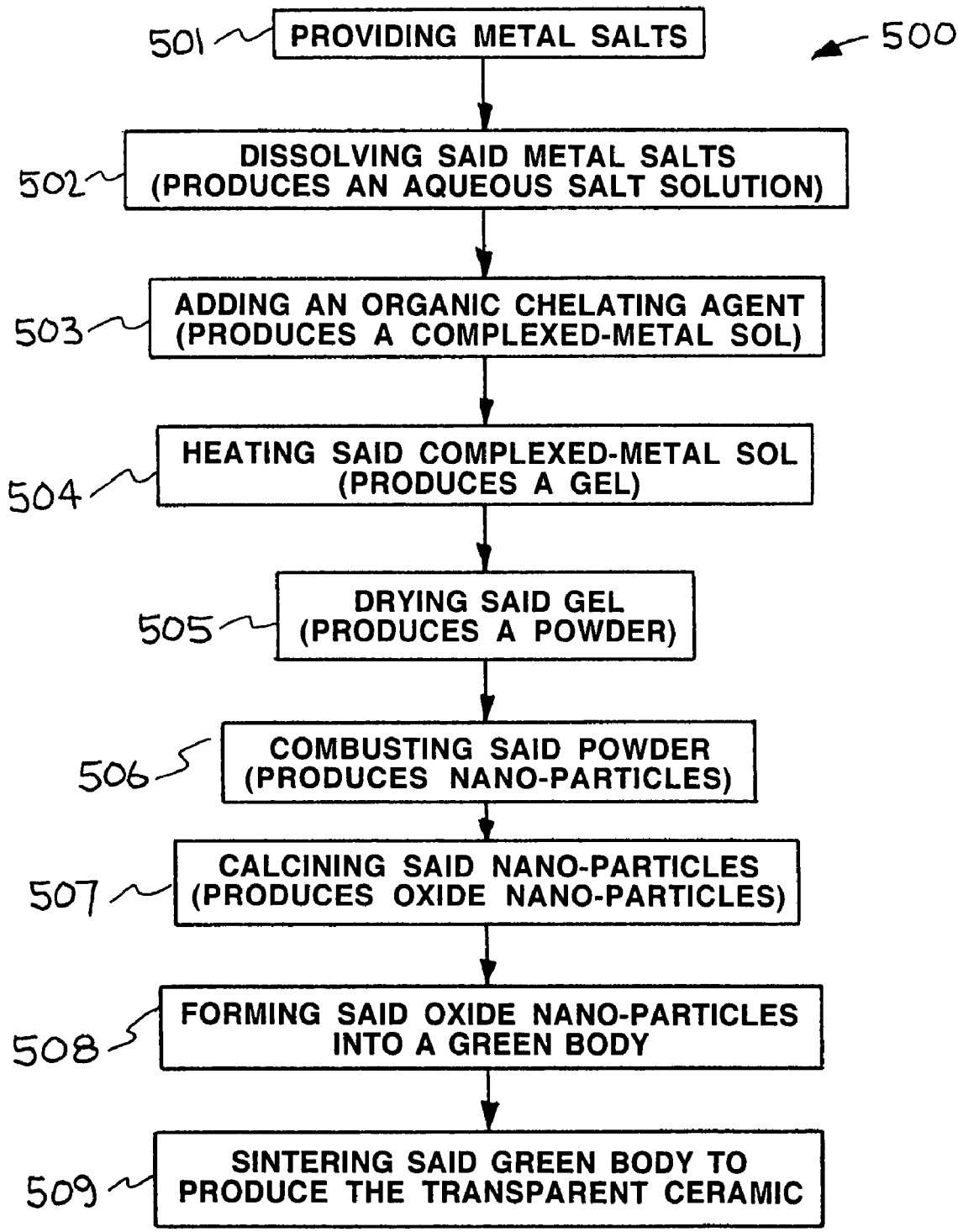
FIG. 5 illustrates yet another embodiment of the present invention showing a method of making a transparent ceramic.

Referring to FIG. 5, another embodiment of a method of synthesizing nanoparticles using aqueous organic acid complexation/combustion to provide transparent ceramic materials is illustrated. The method is designated generally by the reference numeral 500. The method 500 is a method of making a transparent ceramic. The method 500 includes the following steps:

Step #501 providing metal salts.
Step #502 dissolving said metal salts to produce an aqueous salt solution.
Step #503 adding an organic chelating agent to produce a complexed-metal sol.
Step #504 heating and stirring said complexed-metal sol to produce a gel.
Step #505 drying said gel to produce a powder.
Step #506 combusting said powder to produce nano-particles.
Step #507 calcining said nano-particles to produce oxide nano-particles.
Step #508 forming said oxide nano-particles into a green body.
Step #509 sintering said green body to produce the transparent ceramic.

As illustrated in FIG. 5, the present invention provides a method 500 of fabricating a transparent ceramic including a number of steps. The steps include providing metal salts (Step #501), dissolving said metal salts, which may include stirring, to produce an aqueous salt solution (Step #502), adding an organic chelating agent to produce a complexed-metal sol (Step #503), heating said complexed-metal, which may include stirring, to produce a gel (Step #504), drying said gel to produce a powder (Step #505), combusting said powder to produce nano-particles (Step #506), calcining said nano-particles to produce oxide nano-particles (Step #507), forming said oxide nano-particles into a green body (Step #508), and sintering said green body to produce the transparent ceramic (Step #509). The method 500 synthesizes nanoparticles using aqueous organic complexation/combustion to provide a transparent ceramic.

The method 500 provides a transparent ceramic including a garnet structure such as $Lu_3Al_5O_{12}$ or $Y_3Al_5O_{12}$. Nanocrystals are sintered under controlled conditions to form optically transparent polycrystalline optical materials. Transparent ceramic processing is a route to fabrication of polycrystalline materials exhibiting more uniform doping, homogeneity and potential for very large size compared to single crystals of the same material.

The method 500 has many uses. For example, the method 500 has use in producing scintillator crystals for radiation counters. The method 500 also has use in producing transparent armor. The method 500 also has use in producing scintillators for X-ray imaging, computer tomography (CT) screens, and positron emission tomography (PET) detectors. The method 500 has use in producing transparent optical ceramics for multiple uses including blast shields, optics, and laser crystals.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of making a transparent ceramic, comprising the steps of:
    providing metal salts,
    dissolving said metal salts to produce an aqueous salt solution,
    adding an organic chelating agent to produce a complexed-metal sol,
    heating said complexed-metal sol to produce a gel,
    drying said gel to produce a powder,
    synthesizing nanoparticles by combusting said powder to produce said nano-particles,
    calcining said nano-particles to produce oxide nano-particles,
    forming said oxide nano-particles into a green body, and
    sintering said green body to produce the transparent ceramic.

2. The method of claim 1 wherein said step of providing metal salts comprises providing nitrate, chloride, acetate, acetylacetonate, or carbonate metal salts or a combination thereof.

3. The method of claim 1 wherein said step of adding an organic chelating agent to produce a complexed-metal the chelating agent is a tri-dentate organic species.

4. The method of claim 1 wherein said step of adding an organic chelating agent to produce a complexed-metal sol comprises adding oxalic, malic, polygalacturonic, tannic, fulvic, tartaric, succinic, pyruvic or other tri-dentate organic species organic chelating agent.

5. The method of claim 1 wherein said step of adding an organic chelating agent to produce a complexed-metal sol comprises adding citric acid as an organic chelating agent to produce a complexed-metal sol.

6. The method of claim 1 wherein said step of drying said gel to produce a powder comprises drying said gel in a vacuum to produce a powder.

7. The method of claim 1 wherein said step of combusting said powder to produce nano-particles comprises heating said powder in air at 300-600° C.

8. The method of claim 1 wherein said step of calcining said nano-particles to produce oxide nano-particles comprises combusting said powder by heating said nano-particles in air at 600-1200° C. to produce oxide nano-particles.

9. The method of claim 1 wherein said step of forming said oxide nano-particles into a green body comprises uniaxial pressing, cold isostatic pressing, or slip casting said oxide nano-particles to form a green body.

10. The method of claim 1 wherein said step of sintering said green body to produce the transparent ceramic comprises vacuum sintering, controlled atmosphere sintering, pulsed-electric current sintering, plasma sintering, microwave sintering, laser sintering, radio-frequency sintering, or hot-pressing said green body to produce the transparent ceramic.

11. The method of fabricating a transparent ceramic of claim 1 wherein said step of sintering said green body to produce the transparent ceramic comprises vacuum sintering said green body for 2-12 hours at 1700-1900° C. to produce the transparent ceramic.

12. The method of claim 1 wherein said steps of forming said oxide nano-particles into a green body and sintering said green body comprise:
(a) green body formation via uniaxial pressing, cold isostatic pressing, or slip casting,
(b) followed by consolidation via vacuum sintering, controlled atmosphere sintering, pulsed-electric current sintering, plasma sintering, microwave sintering, laser sintering, radio-frequency sintering, or hot-pressing, and
(c) subsequent hot isostatic pressing to improve clarity, or any combination thereof.

13. The method of fabricating a transparent ceramic of claim 1 wherein the transparent ceramic has a cubic garnet structure including $Lu_3Al_5O_{12}$, $Y_3Al_5O_{12}$, $Gd_3Al_5O_{12}$ and related materials, $(A_{1-x}, B_x, etc.)_3(C_{1-y}, D_y, etc.)_5O_{12}$ where first site (A, B, etc.) can contain any mixture of the following that results in the garnet structure: Y, Gd, Lu, La, Tb, Pr; and the second site (C, D, etc.) site can contain any mixture of the following that results in the garnet structure: Al, Ga, Sc.

14. The method of fabricating a transparent ceramic of claim 1 wherein said step of dissolving said metal salts to produce an aqueous salt solution includes stirring said metal salts to produce an aqueous salt solution.

15. The method of fabricating a transparent ceramic of claim 1 wherein said step of heating said complexed-metal sol to produce a gel includes stirring said complexed-metal sol to produce a gel.

16. A method of fabricating a transparent ceramic, comprising the steps of:
providing metal salts,
dissolve and stir said metal salts to produce an aqueous salt solution,
add an organic chelating agent to produce a complexed-metal sol,
heat and stir said complexed-metal sol to produce a gel,
dry said gel to produce a powder,
synthesize nanoparticles by combusting combust said powder in air to produce said nano-particles,
calcine said nano-particles in air to produce oxide nano-particles,
form said oxide nano-particles in to a green body, and
sinter said green body to produce the transparent ceramic.

17. The method of fabricating a transparent ceramic of claim 16 wherein said step of providing metal salts is providing nitrate, chloride, or nitrate and chloride metal salts.

18. The method of fabricating a transparent ceramic of claim 16 wherein said organic chelating agent is citrate.

19. The method of fabricating a transparent ceramic of claim 16 wherein said organic chelating agent is citric acid.

20. The method of fabricating a transparent ceramic of claim 16 wherein said organic chelating agent is the oxalic, malic, polygalacturonic, tannic, fulvic, tartaric, succinic, pyruvic, or other tri-dentate organic species.

21. The method of fabricating a transparent ceramic of claim 16 wherein said step of combusting said powder in air comprises heating said powder in air at 300-600° C.

22. The method of fabricating a transparent ceramic of claim 16 wherein said step of calcine said powder in air to produce oxide nano-particles comprises calcine said powder in air at 600-1200° C. to produce said oxide nano-particles.

23. The method of fabricating a transparent ceramic of claim 16 wherein said step of sinter comprises vacuum sintering for 2-12 hours at 1700-1900° C. to produce a transparent ceramic.

24. The method of fabricating a transparent ceramic of claim 16 wherein said steps of forming a green body and sintering said green body comprise:
(a) green body formation via uniaxial pressing, cold isostatic pressing, or slip casting,
(b) followed by consolidation via vacuum sintering, controlled atmosphere sintering, pulsed-electric current sintering, plasma sintering, microwave sintering, laser sintering, radio-frequency sintering, or hot-pressing, and
(c) subsequent hot isostatic pressing to improve clarity, or any combination thereof.

25. A method of fabricating a transparent oxide ceramic scintillator, comprising the steps of:
providing metal salts,
dissolve and stir said metal salts to produce an aqueous salt solution,
add an organic chelating agent to produce a complexed-metal sol,
heat and stir said complexed-metal sol to produce a gel,
dry said gel to produce a powder,
synthesize nanoparticles by combusting said powder in air to produce said nano-particles,
calcine said nano-particles in air to produce oxide nano-particles,
form said oxide nano-particles in to a green body, and sinter said green body to produce the transparent oxide ceramic scintillator.

26. The method of fabricating a transparent oxide ceramic scintillator of claim 25 wherein said step of providing metal salts comprises providing nitrate, chloride, acetate, acetylacetonate, or carbonate metal salts or a combination thereof.

27. The method of fabricating a transparent oxide ceramic scintillator of claim 25 wherein in said step of adding an organic chelating agent to produce a complexed-metal, the chelating agent is a tri-dentate organic species such as oxalic, malic, polygalacturonic, tannic, fulvic, tartaric, succinic, pyruvic, or other organic species.

28. The method of fabricating a transparent oxide ceramic scintillator of claim 25 wherein said step of adding an organic chelating agent to produce a complexed-metal the chelating agent is oxalic, malic, polygalacturonic, tannic, fulvic, tartaric, succinic, pyruvic or other tri-dentate organic species.

29. The method of fabricating a transparent oxide ceramic scintillator of claim 25 wherein said step of adding an organic chelating agent to produce a complexed-metal sol comprises adding citric acid to produce a complexed-metal sol.

30. The method of fabricating a transparent oxide ceramic scintillator of claim 25 wherein said step of drying said gel to produce a powder comprises drying said gel in a vacuum to produce a powder.

31. The method of fabricating a transparent oxide ceramic scintillator of claim 25 wherein said step of combusting said powder to produce nano-particles comprises heating said powder in air at 300-600° C.

32. The method of fabricating a transparent oxide ceramic scintillator of claim 25 wherein said step of calcining said nano-particles to produce oxide nano-particles comprises heating said nano-particles in air at 600-1200° C. to produce oxide nano-particles.

33. The method of fabricating a transparent oxide ceramic scintillator of claim 25 wherein said step of forming said oxide nano-particles into a green body comprises uniaxial pressing, cold isostatic pressing, or slip casting said oxide nano-particles to form a green body.

34. The method of fabricating a transparent oxide ceramic scintillator of claim 25 wherein said step of sintering said green body to produce the transparent ceramic comprises vacuum sintering, controlled atmosphere sintering, pulsed-electric current sintering, plasma sintering, microwave sintering, laser sintering, radio-frequency sintering, or hot-pressing said green body to produce the transparent ceramic.

35. The method of fabricating a transparent oxide ceramic scintillator of claim 25 wherein said step of sintering said green body to produce the transparent ceramic comprises vacuum sintering for 2-12 hours at 1700-1900° C. to produce the transparent ceramic.

36. The method of fabricating a transparent oxide ceramic scintillator of claim 25 wherein said steps of forming said oxide nano-particles into a green body and sintering said green body comprise:
  (a) green body formation via uniaxial pressing, cold isostatic pressing, or slip casting,
  (b) followed by consolidation via vacuum sintering, controlled atmosphere sintering, pulsed-electric current sintering, plasma sintering, microwave sintering, laser sintering, radio-frequency sintering, or hot-pressing, and
  (c) subsequent hot isostatic pressing to improve clarity, or any combination thereof.

37. The method of fabricating a transparent oxide ceramic scintillator of claim 25, including the step of: activating said transparent oxide ceramic scintillator using Ce or Pr.

38. The method of fabricating a transparent oxide ceramic scintillator of claim 25, including the step of: activating said transparent oxide ceramic scintillator using Bi, Eu, Tb, Gd, Sm, Er, Nd.

* * * * *